(12) United States Patent
Fabre

(10) Patent No.: US 8,095,252 B2
(45) Date of Patent: Jan. 10, 2012

(54) PILOTING METHOD AND DEVICE AVOIDING THE PILOT INDUCED OSCILLATIONS

(75) Inventor: Pierre Fabre, Tournefeuille (FR)

(73) Assignee: Airbus Operations SAS, Toulouse (FR)

( * ) Notice: Subject to any disclaimer, the term of this patent is extended or adjusted under 35 U.S.C. 154(b) by 371 days.

(21) Appl. No.: 12/467,180

(22) Filed: May 15, 2009

(65) Prior Publication Data
US 2009/0292410 A1    Nov. 26, 2009

(30) Foreign Application Priority Data
May 20, 2008    (FR) ...................................... 08 02727

(51) Int. Cl.
*G05D 1/06* (2006.01)

(52) U.S. Cl. ...... 701/8; 701/3; 701/4; 701/11; 244/75.1; 244/228

(58) Field of Classification Search ................ 701/3, 11, 701/4; 318/561, 620, 621; 244/75.1, 224, 244/228, 178, 181
See application file for complete search history.

(56) References Cited

U.S. PATENT DOCUMENTS

| 4,298,833 | A | * | 11/1981 | Edwards et al. | ............... 318/561 |
| 5,935,177 | A | * | 8/1999 | Cox et al. | ........................... 701/9 |
| 7,225,061 | B2 | * | 5/2007 | Raimbault et al. | ................ 701/3 |
| 2004/0098176 | A1 | | 5/2004 | Raimbault | |

FOREIGN PATENT DOCUMENTS
EP    1 420 319    5/2004

OTHER PUBLICATIONS

Preliminary Search Report dated Apr. 23, 2008 w/ English translation.

* cited by examiner

*Primary Examiner* — Behrang Badii
(74) *Attorney, Agent, or Firm* — Dickinson Wright PLLC

(57) ABSTRACT

A piloting method and device for avoiding pilot induced oscillations filters a piloting order with a non-linear filtering function that is controlled by speed comparison information.

9 Claims, 3 Drawing Sheets

PILOTING METHOD AND DEVICE AVOIDING THE PILOT INDUCED OSCILLATIONS

FIELD OF THE INVENTION

The present invention relates to a piloting method and system for eliminating, in a piloting order, oscillations corresponding to induced pilot oscillations, and an aircraft provided with such a system.

BACKGROUND OF THE RELATED ART

It is known that the piloting devices (control columns, rudder bars) of modern aircraft are easy to handle by the pilot and/or the copilot of said aircraft, the tilting of the latter possibly being very fast. On the other hand, the actuators of the movable aerodynamic surfaces of the aircraft (ailerons, flaps, control surfaces, etc.), controlled from these piloting devices, cannot respond instantaneously to the piloting orders generated by the latter. There may therefore be, at high piloting amplitudes, a significant phase shifting between the displacement of a piloting device and that of the movable aerodynamic surfaces that it controls.

The result of this is that the pilot, observing that the response of the aircraft is delayed, may have a tendency to further increase the tilt amplitude of said control member. By then, when the delay time has elapsed, the response of the aircraft becomes far greater than planned, so that the pilot rapidly reverses the tilt of said control member, so that the same situation is repeated in a movement in the opposite direction, and so on. There therefore appears, in the aircraft, induced pilot oscillations—generally referred to PIO in the aeronautical field, which can deteriorate piloting accuracy.

To try to resolve such a problem, it is known to increase the dimensioning of the actuators of the controlled aerodynamic surfaces and their hydraulic and electrical power supplies, which increases the costs and weight of the aircraft. Such cost and weight increases can become critical for large aircraft.

Also known are piloting systems equipped with non-linear filters for processing the piloting order and converting it into a piloting order free of oscillations corresponding to induced pilot oscillations.

However, such non-linear filters present the drawback of attenuating certain piloting orders (for example, abrupt high-amplitude orders) which do not however correspond to induced pilot oscillations and consequently should not be attenuated.

Furthermore, the non-linear filters of these piloting systems do not allow accurate control of the speed of amplitude variation of the control orders intended for the actuators of the movable aerodynamic surfaces.

SUMMARY OF THE INVENTION

The object of the present invention is to overcome these drawbacks.

To this end, according to the invention, the method for eliminating oscillations, corresponding to induced pilot oscillations, in a piloting order generated by the action of the pilot of an aircraft on a piloting device controlling a movable aerodynamic surface of said aircraft, said surface being actuated by actuating means, according to which:

said piloting order is filtered by means of a non-linear filter, the filtering function of which comprises at least one filtering parameter;

a set of piloting laws is used to determine a control order for said actuating means from said filtered piloting order;

is noteworthy in that:

the actual maximum speed of amplitude variation of said control order is estimated;

a reference speed of amplitude variation of said control order, compatible with the speed of deployment of said actuating means, is determined such that, when said actual maximum speed is at least approximately equal to said reference speed, said control order is free of oscillations corresponding to induced pilot oscillations;

said actual maximum speed is compared with said reference speed in order to determine comparison information;

a suitable value of said filtering parameter is determined, based on said comparison information, for which said actual maximum speed is at least approximately equal to said reference speed; and said suitable value is used to modify the current value of said filtering parameter.

Thus, the inventive method makes it possible to adapt the response of the non-linear filter so as to make the maximum speed of amplitude variation of the control orders converge, at least approximately, toward the reference speed so that these control orders are free of PIO oscillations.

Furthermore, such a method makes it possible to provide accurate control of the speed of variation of the amplitude of the control orders intended for the actuating means of the movable aerodynamic surfaces.

Advantageously, said filtering parameter is a time constant.

The present invention also relates to a piloting system for implementing the method as mentioned hereinabove. Such a piloting system, for eliminating oscillations corresponding to induced pilot oscillations, in a piloting order generated by the action of the pilot of an aircraft on a piloting device controlling a movable aerodynamic surface of said aircraft, said surface being actuated by actuating means, said system comprising:

a non-linear filter, the filtering function of which comprises a filtering parameter, capable of filtering said piloting order;

a set of piloting laws, receiving said filtered piloting order, capable of delivering a control order to said actuating means;

is noteworthy:

in that said non-linear filter comprises a control input of said filtering function; and in that said system further comprises an adaptation loop, linking the output of said set of piloting laws to said control input, capable of modifying said filtering parameter so that said control order is free of oscillations corresponding to induced pilot oscillations.

According to the invention, the adaptation loop preferably comprises:

means of estimating the actual maximum speed of amplitude variation of said control order;

means of comparing said actual maximum speed with a reference speed of amplitude variation of said control order, said comparison means being capable of delivering comparison information; and means of determining a suitable value of said filtering parameter, from said comparison information, for which said actual maximum speed is at least approximately equal to the reference speed.

According to another characteristic of the invention, said non-linear filter advantageously comprises:
- a phase-advance filter capable of amplifying said piloting order;
- a first limit capable of clipping said piloting order amplified by said phase-advance filter; and
- a phase-delay filter capable of compensating the amplification and phase advance introduced by the phase-advance filter.

Preferably, said estimation means comprise:
- first filtering means capable of delivering a signal, without noise, representative of the instantaneous speed of amplitude variation of said control order;
- second filtering means, linked to said first filtering means, capable of extracting the absolute value of said signal representative of said instantaneous speed and delivering a signal representative of said absolute value;
- a first looped-back integrating filter, linked to said second filtering means, comprising a first subtractor, a divider and a first integrator, the output of which is looped back to an input of said first subtractor, said first looped-back integrating filter being capable of delivering a signal representative of the average speed of amplitude variation of said control order;
- a first gain, linked to said first looped-back integrating filter, capable of delivering a signal representative of the actual maximum speed of amplitude variation of said control order; and
- a second looped-back integrating filter, similar to said first looped-back integrating filter and linked to said first gain, capable of delivering a signal representative of said actual maximum speed of said control order without any residual oscillations.

Moreover, said comparison means preferably comprise:
- a second subtractor capable of subtracting said reference speed from said actual maximum speed and delivering a signal representative of the difference of these two speeds; and
- third filtering means, linked to said second subtractor, capable of slightly filtering said signal delivered by said second subtractor and delivering a signal representative of said comparison information.

Advantageously, said determination means comprise:
- a multiplier capable of multiplying the gain of said adaptation loop with said signal representative of said comparison information and delivering a signal representative of this product;
- a Proportional/Integral regulator, linked to said multiplier, comprising a second integrator, a first adder, a second limit, a second gain and fourth filtering means, said regulator being capable of delivering a signal representative of the integration of said signal delivered by said multiplier;
- a second adder, linked to said regulator, capable of adding a time constant to said signal delivered by said regulator; and
- a third limit, linked to said second adder, capable of delivering a signal representative of said suitable value of said filtering parameter.

The present invention also relates to an aircraft which comprises a piloting system as mentioned hereinabove.

BRIEF DESCRIPTION OF THE DRAWING

The figures of the appended drawing will clearly show how the invention can be implemented. In these figures, identical references refer to similar elements.

DETAILED DESCRIPTION OF THE INVENTION

Figure 1:
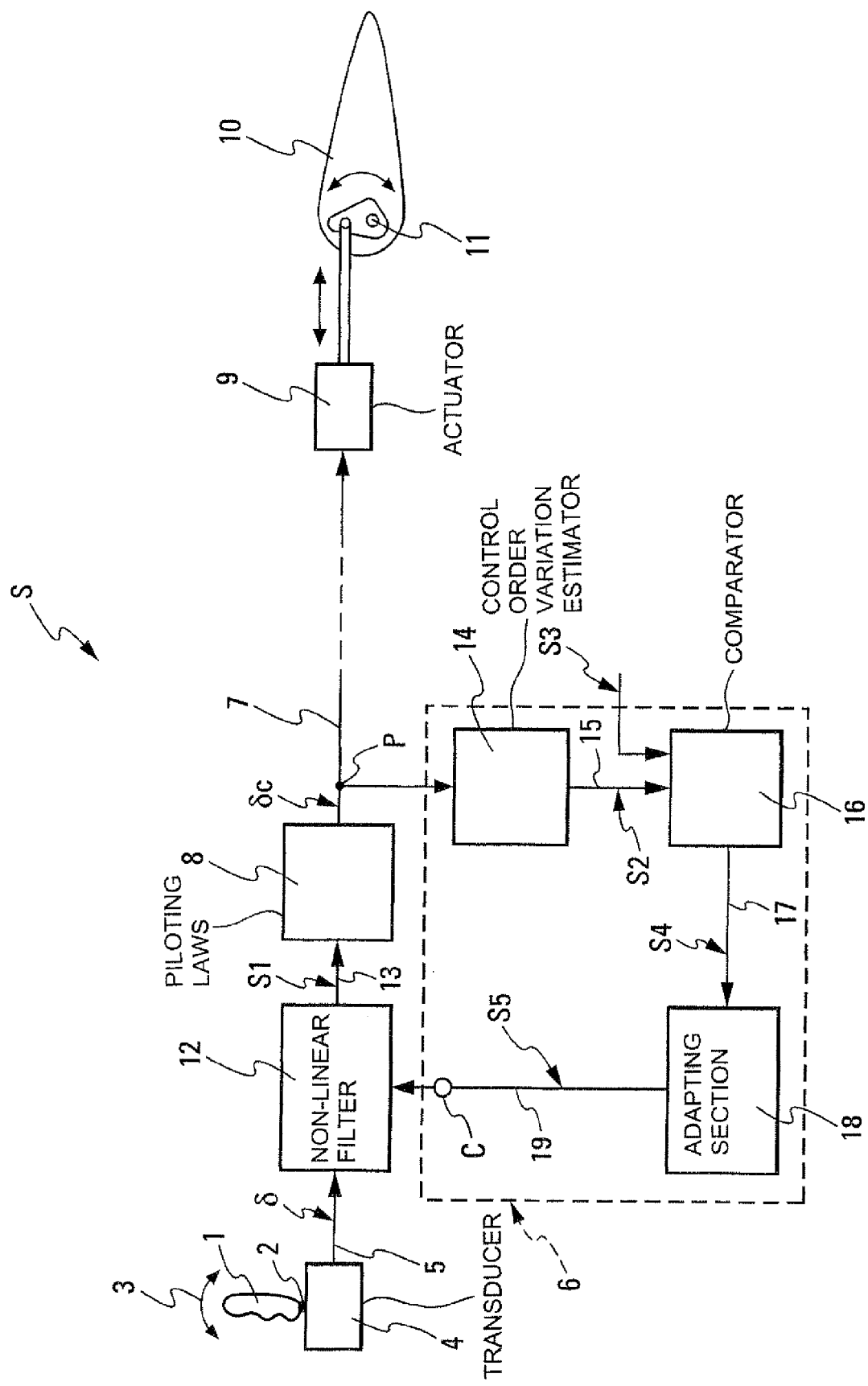
FIG. 1 shows the block diagram of a particular embodiment of the present invention.

The piloting system S, diagrammatically represented in FIG. 1, comprises, as is known, a piloting device 1, for example of the control column type, that can tilt about an articulation 2 in two opposite directions (symbolized by the double arrow 3). The piloting device 1 is associated with a transducer 4 capable of delivering, at its output 5, an electrical piloting order $\delta$ representative of the tilt amplitude of the piloting device 1.

The piloting order $\delta$ is then transmitted to a non-linear filter 12 capable of delivering, at its output 13, a signal S1 representative of the filtered piloting order $\delta$ (for example, attenuated but without phase shifting). The filtering function of the filter 12 comprises two filtering parameters T1 and T2, each corresponding to a time constant.

The piloting system S also comprises a set of piloting laws 8, which receives the signal S1, capable of delivering, at its output 7, a control order $\delta c$ intended for an actuator 9. The latter is capable of turning a movable aerodynamic surface 10 (for example an aileron) of an aircraft (not represented) about its rotation axis 11.

Furthermore, in accordance with the present invention, the non-linear filter 12 comprises a control input C of said filtering function.

According to the invention, the piloting system S also comprises an adaptation loop 6 which links the output 7 (point P in FIG. 1) of the set of piloting laws 8 to the control input C of said non-linear filter 12.

The inventive adaptation loop 6 comprises:
- means 14 of estimating the actual maximum speed of amplitude variation of the control order $\delta c$. These estimation means 14 are capable of delivering, at their output 15, a signal S2 representative of this actual maximum speed;
- a comparator 16 which receives the signal S2 and a signal S3 representative of a reference speed of amplitude variation of said piloting order $\delta c$ such that, when the actual maximum speed is at least approximately equal to the reference speed, the control order $\delta c$ is free of oscillations corresponding to induced pilot oscillations. The comparator 16 is capable of performing the comparison of the actual maximum speed of the control order $\delta c$ with the desired reference speed, and delivering, at its output 17, an error signal S4 representative of the difference of these two speeds; and
- adapting means 18 receiving the error signal S4. These adapting means 18 are capable of modifying the response of the non-linear filter 12 until the actual maximum speed of the control order $\delta c$ becomes at least approximately equal to the desired reference speed. For this, the adapting means 18 are capable of delivering, at their output 19, a signal S5 intended for the control input C representative of the modification of at least one filtering parameter of the filtering function of the non-linear filter 12.

The adaptation loop 6 thus provides feedback control of the non-linear filter 12.

Figure 2:
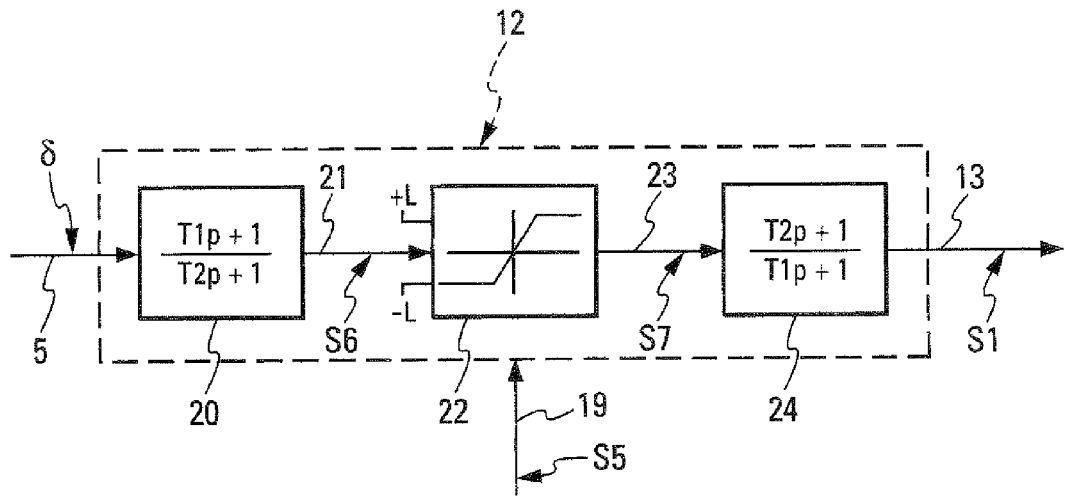
FIGS. 2 to 5 represent block diagrams respectively of the non-linear filter, of the estimation means, of the comparator and of the adapting means, that can be used to form the piloting system according to the present invention.

FIG. 2 diagrammatically represents, in block diagram form, an exemplary non-linear filter 12 according to the particular embodiment of the present invention.

Thus, the non-linear filter 12 comprises:
a first order phase-advance filter 20, the transfer function of which is equal to:

$$H_1(p) = \frac{T1p + 1}{T2p + 1}$$

where p represents the Laplace variable and T1 and T2 respectively represent the first and second time constants of the filter 20. The phase-advance filter 20 is capable of amplifying the piloting order δ and delivering, at its output 21, a signal S6 representative of this amplified piloting order δ;

a limit 22, which receives the signal S6, characterized by an upper limit +L and a lower limit −L. When the amplitude of the signal S6 is greater than the limit L, the limit 22 is capable of clipping the latter and delivering, at its output 23, a clipped signal S7. Otherwise (amplitude of S6 at most equal to the limit L), the signal S7 is similar to the signal S6;

a phase-delay filter 24 which receives the signal S7. The transfer function of the phase-delay filter 24 is the reverse of that of the phase-advance filter 20. Thus, the phase-delay filter 24 is capable of compensating the amplification and phase advance introduced by the filter 20 and delivering, at its output 13, the signal S1 representative of the filtered piloting order δ.

Thus, since the phase-advance 20 and phase-delay 24 filters have reverse transfer functions, and since the limit 22 does not phase-shift the signal that it receives, the non-linear filter 12 is capable of attenuating the piloting order δ without generating any phase shifting.

The overall gain of the non-linear filter 12, at a given frequency, depends on T1 and on the ratio T1/T2. T1 provides the frequency 1/T1 from which the frequencies will be amplified by the phase-advance filter 20 and will consequently be likely to be clipped by the limit 22 and therefore attenuated by the non-linear filter 12. By varying T1 and T2, it is therefore possible to control the frequencies that will be attenuated and their attenuation level.

Figure 3:
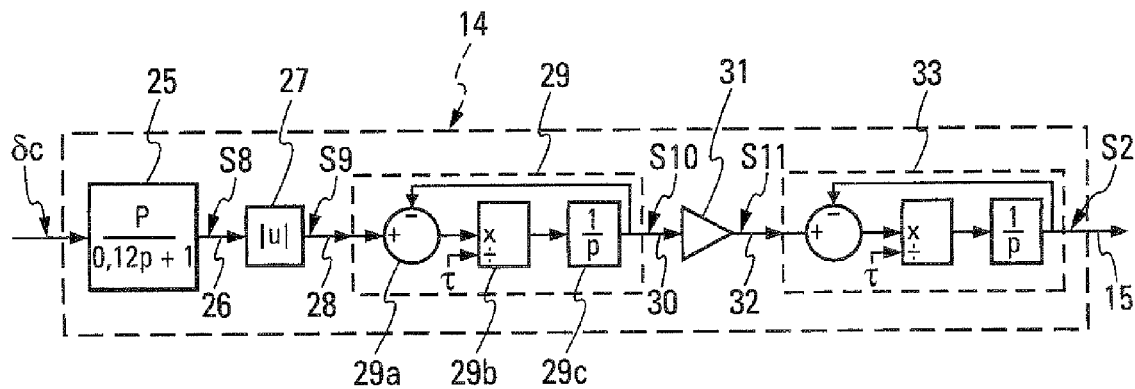

FIG. 3 represents an exemplary block diagram of the estimation means 14.

These estimation means 14 comprise:
a first filter 25, capable of producing a filtered derivation of the control order δc received at the input and delivering, at its output 26, a signal S8 without noise representative of the instantaneous speed of amplitude variation of the control order δc. This first filter 25 is defined by the following transfer function:

$$H_2(p) = \frac{p}{0.12p + 1};$$

a second filter 27, capable of extracting the absolute value of the signal S8 received as input and delivering, at its output 28, a signal S9, the average value of which is not equal to zero over one oscillation;

a first looped-back integrating filter 29, which receives the signal S9

It comprises a subtractor 29a, a divider 29b and an integrator 29c, the output of the integrator 29c being looped back to an input of the subtractor 29a. Furthermore, the divider 29b receives on one of its inputs, a time constant τ, for example equal to τ=0.75, in order to attenuate by half the residual oscillations at the output of the second filter 27 beyond 4 rad/s (this corresponds to an input oscillation of 2 rad/s, the low value of the pilot induced oscillations phenomenon). The first integrating filter 29 is capable of delivering, at its output 30, a signal S10 representative of the average speed of amplitude variation of the control order δc;

a gain 31 which receives the signal S10. This gain 31 (for example equal to 1.66) is capable of delivering, at its output 32, the signal S11 representative of the maximum speed of amplitude variation of the control order δc;

a second looped-back integrating filter 33 (similar to the first integrating filter 29) which receives the signal S11. It is capable of delivering, at its output 15, the signal S2 in which the residual oscillations of the signal S11 have been eliminated.

Figure 4:
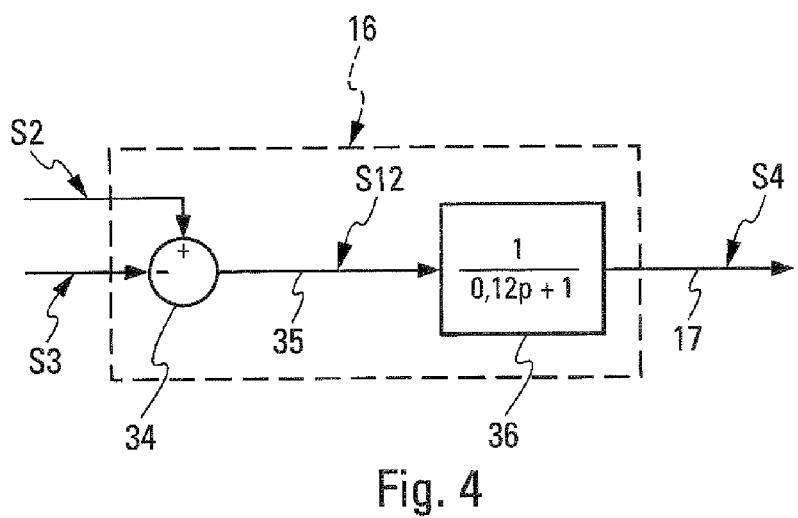

FIG. 4 represents an exemplary comparator 16 in the form of a block diagram.

Such a comparator 16 comprises:
a subtractor 34 capable of subtracting the desired reference speed, associated with the signal S3, from the actual maximum speed, associated with the signal S2 (received as input for the comparator 16), and delivering, at its output 35, a signal S12 representative of the difference of these two speeds; and a filter 36 capable of slightly filtering the signal S12 and delivering, at its output 17, the error signal S4 which will be used by the adapting means 18. The transfer function of the filter can be defined by the following relation:

$$H_3(p) = \frac{1}{0.12p + 1}$$

Figure 5:
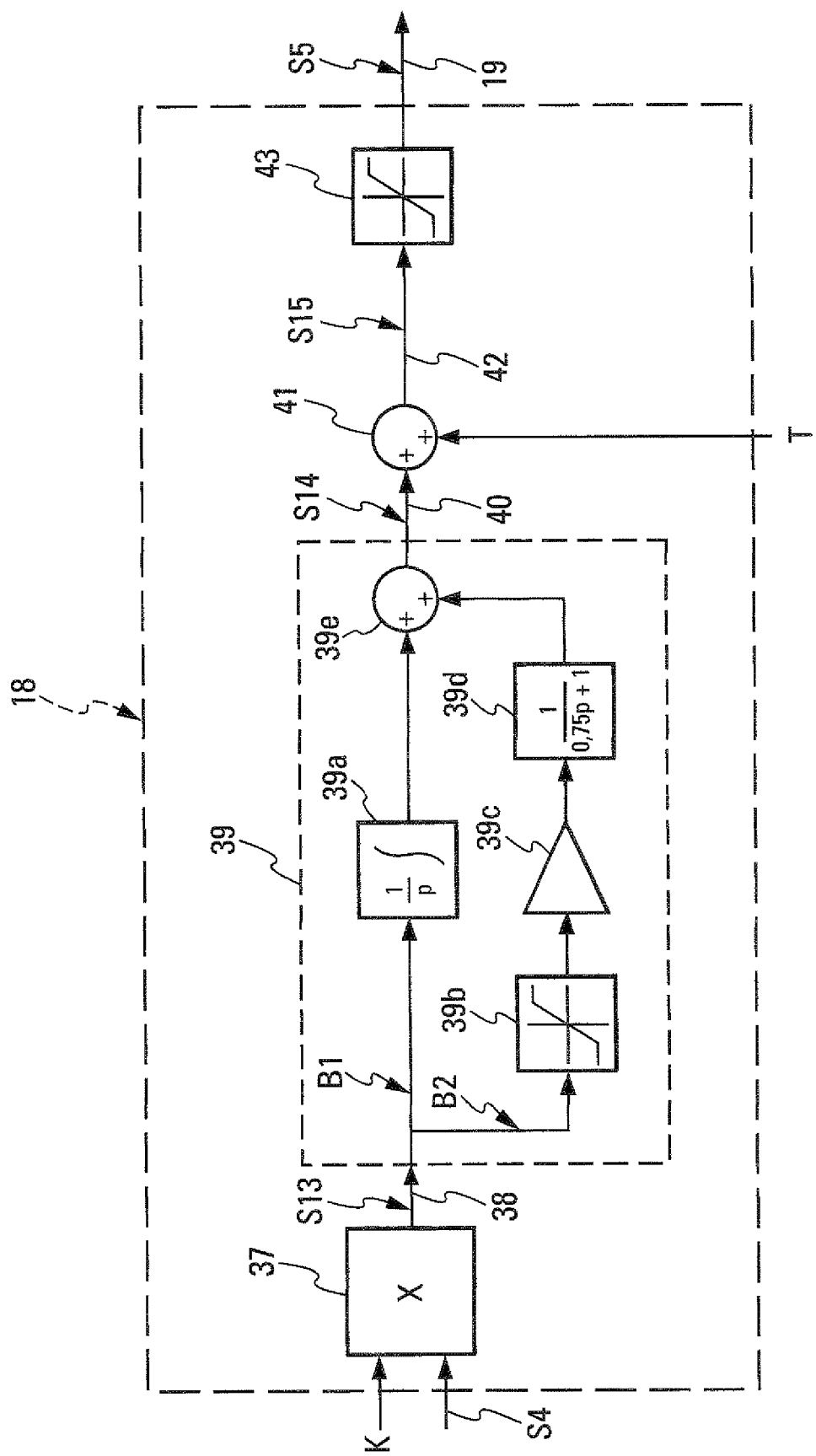

Moreover, as the block diagram of FIG. 5 illustrates, the adapting means 18, according to the particular embodiment of the invention, comprise, for example:

a multiplier 37, capable of multiplying the error signal S4 (that it receives as input) with the gain K of the adaptation loop 6 (the determination of which is detailed hereinbelow) and delivering, at its output 38, a signal S13 representative of this product;

a Proportional/integral regulator 39 which receives the signal S13. This PI regulator 39 comprises an integral branch B1, comprising an integrator 39a, and a proportional branch B2, formed by a limit 39b, a gain 39c and a filter 39d, the outputs of these two branches being added by an adder 39e. The gain 39c is, for example, equal to 0.75. The transfer function of the filter 39d can be defined by the relation:

$$H_4(p) = \frac{1}{0.75p + 1}.$$

The PI regulator 39 is capable of delivering, at its output 40, a signal S14 representative of the integration of the signal S13;

an adder 41 which receives, on the one hand, the signal S14 and, on the other hand, a time constant T (corresponding to the initial value of the time constants T1 and T2 of the non-linear filter 12), for example equal to 0.2 s. The adder 41 is capable of adding the signal S14 and the time constant T so as to deliver, at its output 42, a signal S15 representative of this addition; and a limit 43 which receives the signal S15. The limit 43 is capable of delivering, at its output 19, the signal S5 representative of the suitable time constant T1.

In the particular embodiment according to the invention, only the value of the time constant T1 of the non-linear filter 12 is modified to obtain a maximum speed of amplitude variation of the control order δc at least approximately equal to the reference speed. Obviously, as a variant, it is possible to adapt at the same time the time constants T1 and T2 of the filtering function of the adaptive non-linear filter 12.

The adaptation of the non-linear filter 12 according to the particular embodiment is performed, for example, in the following manner.

First of all, the steady state of the non-linear filter 12 is determined. If the adaptation loop 6 is stable, the suitable value of T1 makes it possible to check that the maximum speed of amplitude variation of the control order δc is close or equal to the reference speed.

In order to simplify the calculations, the effect of the piloting laws associated with the set of piloting laws 8 is not considered hereinbelow. Consequently, the signal at the output 7 of said set 8 is the signal S1 (the set 8 is, according to this assumption, transparent) and no longer the control order δc.

According to the particular embodiment of the invention, the time constant T1 is linked to the gain K of the adaptation loop as follows:

$$T1 = T + \int K(V_{max} - E) dt$$

where:

T is the initial value of T1;

$V_{max}$ is the maximum speed of amplitude variation of the signal S1 (it will be recalled that the set of piloting laws 8 is assumed transparent);

E is the desired reference speed;

the integration is performed between 0 and a desired maximum value for T1.

It is assumed hereinbelow that the piloting order δ is a sinusoidal signal of amplitude A and angular frequency ω, the maximum speed of which is equal to A.ω.

By calculation, it is easy to demonstrate that the gain of the phase-advance filter 20 is defined by the relation:

$$G1(\omega) = \sqrt{\frac{1 + (T1 \cdot \omega)^2}{1 + (T \cdot \omega)^2}}$$

where T is the initial value of T1 and the value of T2 (T2 remaining constant).

When the amplitude A of the piloting order δ is such that A.G1(ω) exceeds the limit L, the signal S1 at the output of the non-linear filter 12 (for which the speed of amplitude variation is to be controlled) then has an amplitude L/G1(ω) and a maximum speed of amplitude variation:

$$V_{max} = \frac{L \cdot \omega}{G1(\omega)}$$

When the steady state is reached, the maximum speed of the signal S1 is then equal to the reference speed E, and the following applies:

$$V_{max} = E = \frac{L \cdot \omega}{G1(\omega)}$$

which makes it possible to determine the gain G1(ω) in steady state:

$$G1(\omega) = \frac{L \cdot \omega}{E}$$

and the corresponding value of T1:

$$T1 = \frac{1}{\omega}\sqrt{\left[\left(\frac{L\omega}{E}\right)^2 (1 + (T \cdot \omega)^2)\right] - 1}$$

A check is then made to ensure that the system is stable. For this, the variations of the gain G1(ω) of the phase-advance filter 20 are calculated according to the variation of T1. The following is then obtained:

$$dG1(\omega) = \frac{T1 \cdot \omega^2}{G1(\omega)(1 + (T \cdot \omega)^2)} dT1$$

The variation of the maximum speed $V_{max}$ can be caused by:

a variation of the angular frequency ω disturbance parameter);

a variation of T1 (adapting parameter).

Thus, the following applies:

$$dV_{max} = \frac{d}{d\omega}\left(\frac{L \cdot \omega}{G1(\omega)}\right)d\omega + L \cdot \omega \frac{d}{dT1}\left(\frac{1}{G1(\omega)}\right)dT1$$

The variation of $V_{max}$ according to T1 is such that:

$$\frac{dV_{max}}{dT1} = -\frac{L \cdot \omega}{G1(\omega)^2}\frac{dG1(\omega)}{dT1} = -\frac{L \cdot T1 \cdot \omega^3}{G1(\omega) \cdot (1 + (T1 \cdot \omega)^2)} = K1$$

The variation of $V_{max}$ according to ω does not need to be explained. It is simply stated that:

$$\frac{dV_{max}}{d\omega} = K2$$

with K2.dω representing the disturbance introduced into the system.

By neglecting the fast modes (that is, the filters with time constants that are equal to 0.12 s), the following applies:

$$dV_{max} = K2 \cdot d\omega + K1 \cdot dT1$$

and $$dT1 = K \frac{dV_{max}}{(1 + \tau p)^2}\left(\frac{1}{p} + \frac{\tau}{1 + \tau p}\right)$$

where:
τ refers to the time constant of the estimation means 14 (τ=0.75);
K refers to the gain of the adaptation loop;
p refers to the Laplace variable.
The following is then obtained:

$$\frac{dV_{max} - K2 \cdot d\omega}{K1} = K \frac{dV_{max}}{(1+\tau p)^2}\left(\frac{1+2\tau p}{p(1+\tau p)}\right)$$

then, after calculation:

$$dV_{max} = \frac{K2 \cdot p(1+\tau p)^3}{p(1+\tau p)^3 - K1 \cdot K \cdot (1+2\tau p)} d\omega$$

By applying the final value and initial value theorems of the Laplace functions, it can be deduced therefrom that, on an instantaneous variation of the angular frequency of value dω:

$$dV_{max}(t=0) = \lim_{p \to \infty} \frac{K2 \cdot p(1+\tau p)^3}{p(1+\tau p)^3 - K1 \cdot K \cdot (1+2\tau p)} d\omega = K2 \cdot d\omega$$

$$dV_{max}(t=\infty) = \lim_{p \to 0} \frac{K2 \cdot p(1+\tau p)^3}{p(1+\tau p)^3 - K1 \cdot K \cdot (1+2\tau p)} d\omega = 0$$

The latter equation $dV_{max}(t=\infty)=0$ shows the effectiveness of the adapting. In practice, despite the initial speed variation of the signal S1 due to the change of angular frequency, the latter returns to the reference value according to the dynamic range of the transfer function of the abovementioned fourth order. The gain K1 makes it possible to ensure the stability and good damping of this dynamic range.

Thus, as a nonlimiting numeric example, for K1.K=−0.5, the modes obtained (that is, the roots of the fourth order polynomial $p(1+2p)^3 - K1.K.(1+2\tau p)$ with τ=0.75) are satisfactory in terms of response and damping:

$$\begin{cases} p1 = -2.42 \\ p2 = -0.54 + -0.83i \\ p3 = -0.51 \end{cases}$$

If the piloting order δ is a sinus of 20° amplitude with 3 rad/s angular frequency and if the reference speed is 35°/s, the static gain of the phase-advance filter 20 is equal to G1(3)=1.71.

Since T2=0.2 s, G1(3) is obtained for T1=0.58 s.
Finally, since L=20°, K1=−45.
Thus, to have K1.K=−0.5, the gain K of the adaptation loop is equal to K=0.011.

The invention claimed is:

1. A method for eliminating oscillations, corresponding to induced pilot oscillations, in a piloting order generated by the action of the pilot of an aircraft on a piloting device controlling a movable aerodynamic surface of said aircraft, said surface being actuated by actuating means, the method comprising:
filtering said piloting order by means of a non-linear filter, the filtering function of which comprises at least one filtering parameter; and
using a set of piloting laws to determine a control order for said actuating means from said filtered piloting order; wherein:
the actual maximum speed of amplitude variation of said control order is estimated;
a reference speed of amplitude variation of said control order, compatible with the speed of deployment of said actuating means, is determined such that, when said actual maximum speed is at least approximately equal to said reference speed, said control order is free of oscillations corresponding to induced pilot oscillations;
said actual maximum speed is compared with said reference speed in order to determine comparison information;
a suitable value of said filtering parameter is determined, based on said comparison information, for which said actual maximum speed is at least approximately equal to said reference speed; and
said suitable value is used to modify the current value of said filtering parameter.

2. The method as claimed in claim 1, wherein said filtering parameter is a time constant.

3. A piloting system for implementing the method specified under claim 1, for eliminating oscillations corresponding to induced pilot oscillations, in a piloting order generated by the action of the pilot of an aircraft on a piloting device controlling a movable aerodynamic surface of said aircraft, said surface being actuated by actuating means, said system comprising:
a non-linear filter, the filtering function of which comprises a filtering parameter, suitable for filtering said piloting order;
a set of piloting laws, receiving said filtered piloting order, capable of delivering a control order to said actuating means; whereby:
said non-linear filter comprises a control input of said filtering function; and
said system further comprises an adaptation loop, linking the output of said set of piloting laws to said control input, capable of modifying said filtering parameter so that said control order is free of oscillations corresponding to induced pilot oscillations.

4. The system as claimed in claim 3, whereby said adaptation loop comprises:
means of estimating said actual maximum speed of amplitude variation of said control order;
means of comparing said actual maximum speed with a reference speed of amplitude variation of said control order, said comparison means being capable of delivering comparison information; and
means of determining a suitable value of said filtering parameter, from said comparison information, for which said actual maximum speed is at least approximately equal to said reference speed.

5. The system as claimed in claim 3, whereby said non-linear filter comprises:
a phase-advance filter configured to amplify said piloting order;
a first limit configured to clip said piloting order amplified by said phase-advance filter; and
a phase-delay filter configured to compensate the amplification and phase advance introduced by said phase-advance filter.

6. The system as claimed in claim 4, whereby said estimation means comprise:
- first filtering means configured to deliver a signal, without noise, representative of the instantaneous speed of amplitude variation of said control order;
- second filtering means, linked to said first filtering means, configured to extract the absolute value of said signal representative of said instantaneous speed and delivering a signal representative of said absolute value;
- a first looped-back integrating filter, linked to said second filtering means, comprising a first subtractor, a divider and a first integrator, the output of which is looped back to an input of said first subtractor, said first looped-back integrating filter being configured to deliver a signal representative of the average speed of amplitude variation of said control order;
- a first gain, linked to said first looped-back integrating filter, configured to deliver a signal representative of the actual maximum speed of amplitude variation of said control order; and
- a second looped-back integrating filter, similar to said first looped-back integrating filter and linked to said first gain, configured to deliver a signal representative of said actual maximum speed of said control order without any residual oscillations.

7. The system as claimed in claim 4, whereby said comparison means comprise:
- a second subtractor configured to subtract said reference speed from said actual maximum speed and delivering a signal representative of the difference of these two speeds; and
- third filtering means, linked to said second subtractor, configured to slightly filter said signal delivered by said second subtractor and delivering a signal representative of said comparison information.

8. The system as claimed in claim 4, whereby said determination means comprise:
- a multiplier configured to multiply the gain of said adaptation loop with said signal representative of said comparison information and delivering a signal representative of this product;
- a Proportional/Integral regulator, linked to said multiplier, comprising a second integrator, a first adder, a second limit, a second gain and fourth filtering means, said regulator being configured to deliver a signal representative of the integration of said signal delivered by said multiplier;
- a second adder, linked to said regulator, configured to add a time constant to said signal delivered by said regulator; and
- a third limit, linked to said second adder, configured to deliver a signal representative of said suitable value of said filtering parameter.

9. An aircraft, which comprises a piloting system as specified under claim 3.

* * * * *